(12) United States Patent  
Wu et al.

(10) Patent No.: US 11,700,083 B2  
(45) Date of Patent: Jul. 11, 2023

(54) METHOD AND APPARATUS FOR PROCESSING SERVICE DATA IN OPTICAL TRANSPORT NETWORK

(71) Applicant: Huawei Technologies Co., Ltd., Shenzhen (CN)

(72) Inventors: Qiuyou Wu, Dongguan (CN); Wei Su, Chengdu (CN); Yujie Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 165 days.

(21) Appl. No.: 16/987,802

(22) Filed: Aug. 7, 2020

(65) Prior Publication Data  
US 2020/0366412 A1 Nov. 19, 2020

Related U.S. Application Data

(63) Continuation of application No. PCT/CN2018/076014, filed on Feb. 9, 2018.

(51) Int. Cl.  
*H04J 3/16* (2006.01)  
*H04L 1/00* (2006.01)  
*H04B 10/50* (2013.01)

(52) U.S. Cl.  
CPC .......... *H04L 1/0057* (2013.01); *H04B 10/50* (2013.01); *H04J 3/1652* (2013.01);  
(Continued)

(58) Field of Classification Search  
None  
See application file for complete search history.

(56) References Cited

U.S. PATENT DOCUMENTS 7,894,482 B1 * 2/2011 Wu ........................ H04J 3/1652  
370/476  
8,238,373 B2 * 8/2012 Jiang ...................... H04L 12/413  
398/43  
(Continued)

FOREIGN PATENT DOCUMENTS

CN 1770673 A 5/2006  
CN 101499997 A 8/2009  
(Continued)

OTHER PUBLICATIONS

ITU-TG.709.1/Y.1331.1, Series G: Transmission Systems and Media, Digital Systems and Networks: Digital terminal equipments—General, 2017 (Year: 2017).*

(Continued)

*Primary Examiner* — Jai M Lee  
(74) *Attorney, Agent, or Firm* — Conley Rose, P.C.

(57) ABSTRACT

A method for processing service data in an optical transport network includes receiving service data, where the service data is to be mapped to a plurality of consecutive data frames, determining a quantity of code blocks, occupied by the service data, of each of the plurality of consecutive data frames and locations of the code blocks, where the code block includes a payload area and an overhead area, the payload area of the code block is used to carry the service data, and the overhead area of the code block includes identification information of the service data, and mapping the service data to the plurality of consecutive data frames based on the quantity of code blocks and the locations of the code blocks.

26 Claims, 18 Drawing Sheets

(52) U.S. Cl.
CPC .......... *H04L 1/0008* (2013.01); *H04L 1/0011* (2013.01); *H04L 1/0033* (2013.01); *H04L 1/0061* (2013.01)

(56) References Cited

U.S. PATENT DOCUMENTS

| | | | | |
|---|---|---|---|---|
| 8,462,816 B2* | 6/2013 | Yin | ........................ | H04J 3/1652 370/464 |
| 8,675,684 B2* | 3/2014 | Katagiri | ................ | H04J 3/1652 370/465 |
| 8,774,640 B2* | 7/2014 | Xiao | ..................... | H04Q 11/00 398/140 |
| 9,503,191 B2* | 11/2016 | Wu | ......................... | H04B 10/27 |
| 9,819,431 B2* | 11/2017 | Dong | ..................... | H04J 3/1658 |
| 10,164,728 B2* | 12/2018 | Su | .......................... | H04J 3/1652 |
| 10,256,915 B2* | 4/2019 | Su | .......................... | H04B 10/516 |
| 10,374,738 B2* | 8/2019 | Dong | ..................... | H04J 3/1664 |
| 10,411,821 B2* | 9/2019 | Meyer | ................... | H04B 10/27 |
| 10,462,471 B2* | 10/2019 | Su | .......................... | H04L 12/40032 |
| 10,608,766 B2* | 3/2020 | Su | .......................... | H04Q 11/0062 |
| 10,887,052 B2* | 1/2021 | Loprieno | ............. | H04L 1/0047 |
| 11,234,055 B2* | 1/2022 | Xiang | ................ | H04N 21/6118 |
| 2010/0061725 A1 | 3/2010 | Jiang | | |
| 2011/0044686 A1 | 2/2011 | Wu et al. | | |
| 2012/0201535 A1* | 8/2012 | Loprieno | ................... | H04J 3/12 398/45 |
| 2013/0121700 A1* | 5/2013 | Dong | ..................... | H04J 3/1652 398/79 |
| 2018/0013509 A1* | 1/2018 | Meyer | ................... | H04B 10/27 |
| 2018/0098076 A1* | 4/2018 | Su | .......................... | H04J 3/1658 |
| 2018/0123726 A1* | 5/2018 | Vissers | .................. | H04J 14/08 |
| 2021/0091870 A1* | 3/2021 | Zhang | .................. | H04J 3/1664 |
| 2021/0281343 A1* | 9/2021 | Zhang | .................. | H04J 3/1652 |
| 2022/0006556 A1* | 1/2022 | Vissers | .................. | H04J 14/08 |

FOREIGN PATENT DOCUMENTS

| | | | | |
|---|---|---|---|---|
| CN | 101651512 A | 2/2010 | | |
| CN | 101800912 A | 8/2010 | | |
| CN | 102594648 A | 7/2012 | | |
| CN | 103825668 A | 5/2014 | | |
| CN | 106301678 A | 1/2017 | | |
| CN | 106341352 A | 1/2017 | | |
| CN | 107040314 A | 8/2017 | | |
| EP | 2178234 A1 * | 4/2010 | ............ | H04J 14/086 |
| EP | 3297196 A1 | 3/2018 | | |
| EP | 3396879 A1 * | 10/2018 | ............ | H04J 3/1664 |
| EP | 3570466 A1 * | 11/2019 | ............ | H04J 3/1652 |
| WO | 2009006835 A1 | 1/2009 | | |
| WO | 2016197894 A1 | 12/2016 | | |

OTHER PUBLICATIONS

Gorshe, Steve, A Tutorial on ITU-T G.709 Optical Transport Networks (OTN): Technology White Paper, 2010, PMC-Sierra, Inc. (Year: 2010).*

"5G Optical Transport Network Technology," Sep. 21, 2017, 14:16, https://www.sohu.com/a/193521210_505812/, 20 pages.

Li Han, "The New Architecture and Key Technologies for 5G Transport Network," ZTE Technology Journal, Feb. 2018, vol. 24, No. 1, with an English abstract, 5 pages.

3GPP TR 38.912 V1.0.0, "3rd Generation Partnership Project;Technical Specification Group Radio Access Network; Study on New Radio (NR) Access Technology(Release 14)," Mar. 2017, 74 pages.

ITU-T G.709.1/Y.1331.1, "Series G: Transmission Systems and Media, Digital Systems and Networks Digital terminal equipments, General Series Y: Global Information Infrastructure, Internet Protocol Aspects, Next-Generation Networks, Internet of Things and Smart Cities Internet protocol aspects, Transport, Flexible OTN short-reach interface," Jan. 2017, 30 pages.

Vissers, M., et al., "Draft revised Recommendation ITU-T G.709/Y.1331 (for Consent, Feb. 26, 2016)," XP044148233, Feb. 15-26, 2016, 249 pages.

Vissers, M, et al., "Application specific FlexO-LR port on router or other packet switch," XP044212478, Jun. 19-30, 2017, 12 pages.

Su, W., "FlexO-FR OH and multiplexing structure," XP044214367, Oct. 16-20, 2017, 8 pages.

Caia, J., et al., "FlexO-FR Structure Options and Considerations for 5G Mobile Fronthaul Transport," XP044214373, Oct. 16-20, 2017, 14 pages.

Zhang, Y., et al., "A new division scheme of OTN frame format," XP044237363, Jan. 29-Feb. 9, 2018, 4 pages.

* cited by examiner

METHOD AND APPARATUS FOR PROCESSING SERVICE DATA IN OPTICAL TRANSPORT NETWORK

CROSS-REFERENCE TO RELATED APPLICATIONS

This application is a continuation of International Patent Application No. PCT/CN2018/076014, filed on Feb. 9, 2018. The disclosure of the aforementioned application is hereby incorporated by reference in its entirety.

TECHNICAL FIELD

This application relates to the field of optical communications technologies, and in particular, to a method and an apparatus for processing service data in an optical transport network (OTN).

BACKGROUND

Currently, as a core technology of a transport network, an OTN includes technical specifications of an electrical layer and an optical layer. The OTN has abundant operation, administration, and maintenance (OAM) capabilities, a powerful tandem connection monitoring (TCM) capability, and an out-of-band forward error correction (FEC) capability, and can implement flexible scheduling and administration of a large-capacity service.

A slot of a data frame of an existing OTN is allocated to only a fixed port, and unless reconfigured, the slot transmits only service data from the port. This results in low flexibility.

SUMMARY

Embodiments of this application provide a method and an apparatus for processing service data in an OTN, to resolve an existing problem of low flexibility.

According to a first aspect, an embodiment of this application provides a method for processing service data in an OTN, and the method is applied to a transmitter side and includes receiving service data, where the service data is to be mapped to a plurality of consecutive data frames, determining a quantity of code blocks, occupied by the service data, of each of the plurality of consecutive data frames and locations of the code blocks, where the code block includes a payload area and an overhead area, the payload area of the code block is used to carry the service data, and the overhead area of the code block includes identification information of the service data, and mapping the service data to the plurality of consecutive data frames based on the quantity of code blocks and the locations of the code blocks.

In the solution provided in this embodiment of this application, a code block of a smaller granularity is defined in a data frame, and a channel identifier field is defined in an overhead area of the code block. The channel identifier field is used to carry identification information of service data carried in a payload area. Then, before service data is mapped to the data frame, a quantity of code blocks in each data frame that are used to carry the service data and locations of the code blocks are determined depending on a requirement, and then the service data is mapped to the data frame based on the quantity and the locations. In this case, code blocks at a same location in a plurality of consecutive data frames may be occupied by service data from different ports such that flexible configuration of the data frame may be implemented, and data frame transmission flexibility is further improved.

Optionally, the data frame may be a flexible OTN (FlexO) frame or an optical channel data unit (ODU) frame, and the ODU frame may be a flexible rate ODU (ODUflex), an ODUk, or the like.

In a possible design, a rate of the code block is less than or equal to 1 Gigabits per second (Gbps).

In a possible design, when the data frame is a FlexO frame, each FlexO frame may include fixed padding in addition to code blocks. In an embodiment, when a quantity of bits occupied by a payload area of one FlexO frame is not enough to be divided exactly by a quantity of bits occupied by code blocks, remaining bits obtained after exact division are used for fixed padding.

In addition, when the data frame is a FlexO frame, the FlexO frame may not include fixed padding, and a plurality of consecutive FlexO frames constitute one data frame, where the FlexO frame includes a fixed quantity of code blocks. In an embodiment, if a quantity of bits occupied in a payload area of one FlexO frame is not enough to be divided exactly by the quantity of bits occupied by the code blocks, a plurality of consecutive FlexO frames (one FlexO multiframe) may constitute one data frame. A quantity of bits occupied in a payload area of one FlexO multiframe can be divided exactly by the quantity of bits occupied by the code blocks.

In a possible design, the data frame is an ODU frame, and the method may further include mapping, to at least one FlexO frame, a plurality of consecutive ODU frames that carry the service data. According to the design, a code block of a smaller granularity is defined in an ODU frame. In this case, code blocks at a same location in a plurality of consecutive ODU frames may be occupied by service data from different ports. In this way, the ODU frame is more flexibly configured, and then the ODU frame is mapped to a FlexO frame such that the FlexO frame is transmitted more flexibly.

In a possible design, the service data is a packet-type service, and the overhead area of the code block further includes an indication field, where the indication field is used to indicate whether the code block carries the service data. According to the design, a receiving node that receives the code block can determine, based on the indication field, whether there is data in the code block, to determine whether to obtain the service data from the code block.

In a possible design, the service data is a constant bit rate service, the overhead area of the code block further includes a payload length field, and the payload length field is used to indicate a length of the service data carried by the code block. According to the design, a receiving node that receives the code block can determine, based on the payload length field, the length of the service data carried by the code block, to determine whether to obtain the service data of the length from the code block.

In a possible design, the overhead area of the code block may further include a timestamp field, and the timestamp field is used to indicate a time at which the service data is mapped to the code block.

In a possible design, the code block may further include a check area, and the check area of the code block is used to indicate correctness of the service data carried in the payload area of the code block and correctness of content indicated by a field included in the overhead area. According to the design, a receiving node that receives the code block can determine, based on the check area, the correctness of the service data obtained from the code block.

In a possible design, the overhead area may further include an overhead field, and the overhead field includes at least one of the following a large multiframe indication, where the large multiframe indication is used to indicate a period of one large multiframe, the large multiframe includes M consecutive code blocks, and M is a positive integer, a small multiframe indication, where the small multiframe indication is used to indicate a period of one small multiframe, the small multiframe includes N consecutive code blocks, and N is a positive integer less than M, a service type indication, where the service type indication is used to indicate a mapping mode used for mapping the service data to the payload area included in the code block, a backward defect indication, where the backward defect indication is used to indicate that a detected signal fail status is transmitted in an upstream direction, a forward defect indication, where the forward defect indication is used to indicate that a detected signal fail status is transmitted in a downstream direction, an automatic protection switching overhead, where the automatic protection switching overhead is used to carry transmission protection switching protocol information, and a trail trace byte, where the trail trace byte is used to carry a trail trace identifier.

According to a second aspect, an embodiment of this application provides a method for processing service data in an OTN, and the method is applied to a receiver side and includes obtaining a plurality of consecutive data frames, where each of the plurality of consecutive data frames includes a plurality of code blocks, each of the plurality of code blocks includes a payload area and an overhead area, the payload area is used to carry service data, and the overhead area includes identification information of the service data, and identifying code blocks that carry same identification information in the plurality of consecutive data frames, and obtaining, from the code blocks that carry the same identification information, the service data identified by the same identification information.

In the solution provided in this embodiment of this application, a code block of a smaller granularity is defined in a data frame, and a channel identifier field is defined in an overhead area of the code block. The channel identifier field is used to carry identification information of service data carried in a payload area. Code blocks at a same location in a plurality of consecutive data frames may be occupied by service data from different ports. In this case, a node on the receiver side identifies service data from a same port using the channel identifier field such that flexible configuration of the data frame may be implemented, and data frame transmission flexibility is further improved.

In a possible design, a rate of the code block is less than or equal to 1 Gbps.

In a possible design, the data frame is a FlexO frame, and the FlexO frame may further include fixed padding.

In a possible design, each data frame includes a plurality of consecutive FlexO frames, and the plurality of consecutive FlexO frames include a fixed quantity of code blocks.

In a possible design, the data frame may be an optical data unit ODU frame.

In a possible design, the service data is a packet-type service, and an overhead area of a first code block further includes an indication field, where the indication field is used to indicate whether the first code block carries the service data, and the first code block is any code block used to carry the service data.

In a possible design, the service data is a constant bit rate service, and an overhead area of a second code block further includes a payload length field, where the payload length field is used to indicate a length of the service data carried by the second code block, and the second code block is any code block used to carry the service data.

In a possible design, the overhead area of the second code block further includes a timestamp field, and the timestamp field is used to indicate a time at which the service data identified by the same identification information is mapped to the first code block.

In a possible design, each code block may further include a check area, and the check area is used to indicate correctness of the service data carried in the payload area of each code block and correctness of content indicated by a field included in the overhead area.

In a possible design, the overhead area may further include an overhead field, and the overhead field includes at least one of the following a large multiframe indication, where the large multiframe indication is used to indicate a period of one large multiframe, the large multiframe includes M consecutive code blocks, and M is a positive integer, a small multiframe indication, where the small multiframe indication is used to indicate a period of one small multiframe, the small multiframe includes N consecutive code blocks, and N is a positive integer less than M, a service type indication, where the service type indication is used to indicate a mapping mode used for mapping the service data to the payload area included in the code block, a backward defect indication, where the backward defect indication is used to indicate that a detected signal fail status is transmitted in an upstream direction, a forward defect indication, where the forward defect indication is used to indicate that a detected signal fail status is transmitted in a downstream direction, an automatic protection switching overhead, where the automatic protection switching overhead is used to carry transmission protection switching protocol information, and a trail trace byte, where the trail trace byte is used to carry a trail trace identifier.

According to a third aspect, an embodiment of this application provides a method for processing service data in an OTN, and the method is applied to an intermediate node through which a path passes from a transmitter side to a receiver side and the method includes obtaining a data frame, where the data frame includes a fixed quantity of code blocks, each code block includes a payload area and an overhead area, the payload area is used to carry service data, the overhead area includes identification information used to identify the service data, and the identification information included in the overhead area is used to indicate a source port from which the service data comes, and updating the identification information included in the overhead area to identification information of a corresponding destination port in a data table, where the data table includes a correspondence between the identification information of the source port and the identification information of the destination port.

In the solution provided in this embodiment of this application, a code block of a smaller granularity is defined in a data frame, code blocks at a same location in a plurality of consecutive data frames may be occupied by service data from different ports, and a channel identifier field is defined in an overhead area of the code block. The channel identifier field is used to carry identification information of service data carried in a payload area. An intermediate node dynamically updates the channel identifier field during service data transmission, thereby ensuring that a node that receives the data frame can determine code blocks that carry service data from one port. In this way, flexible configuration of the data frame is implemented, and data frame transmission flexibility is further improved.

According to a fourth aspect, an embodiment of this application provides an apparatus for processing service data in an OTN, and the apparatus may be applied to a transmitter side and includes a processor and a memory, where the memory stores program code, and the processor is configured to read and execute the program code stored in the memory, to implement the method according to the first aspect or any one of the designs of the first aspect.

According to a fifth aspect, an embodiment of this application provides an apparatus for processing service data in an OTN, and the apparatus may be applied to a receiver side and includes a processor and a memory, where the memory stores program code, and the processor is configured to read and execute the program code stored in the memory, to implement the method according to the second aspect or any one of the designs of the second aspect.

According to a sixth aspect, an embodiment of this application provides an apparatus for processing service data in an OTN, and the apparatus may be applied to an intermediate node and includes a processor and a memory, where the memory stores program code, and the processor is configured to read and execute the program code stored in the memory, to implement the method according to the third aspect or any one of the designs of the third aspect.

According to a seventh aspect, an embodiment of this application provides a system for processing service data in an OTN, and the system includes the apparatus according to the fourth aspect and the apparatus according to the fifth aspect. Alternatively, the system includes the apparatus according to the fourth aspect, the apparatus according to the fifth aspect, and the apparatus according to the sixth aspect.

According to an eighth aspect, an embodiment of this application further provides a computer storage medium, and the storage medium stores a software program. When the software program is read and executed by one or more processors, the method according to any design of any aspect of the first aspect to the third aspect may be implemented.

According to a ninth aspect, an embodiment of this application provides a computer program product including an instruction. When the computer program product is run on a computer, the computer is enabled to perform the method according to any design of the first aspect to the third aspect.

According to a tenth aspect, an embodiment of this application provides a chip, where the chip is connected to a memory, and is configured to read and execute a software program stored in the memory, to implement the method according to any design of the first aspect to the third aspect.

BRIEF DESCRIPTION OF DRAWINGS

FIG. 3 is a schematic structural diagram of an OTN frame according to an embodiment of this application.

FIG. 7A is a schematic structural diagram of a code block that occupies 192 bytes and is configured for an OTN frame according to an embodiment of this application.

DESCRIPTION OF EMBODIMENTS

Figure 1:
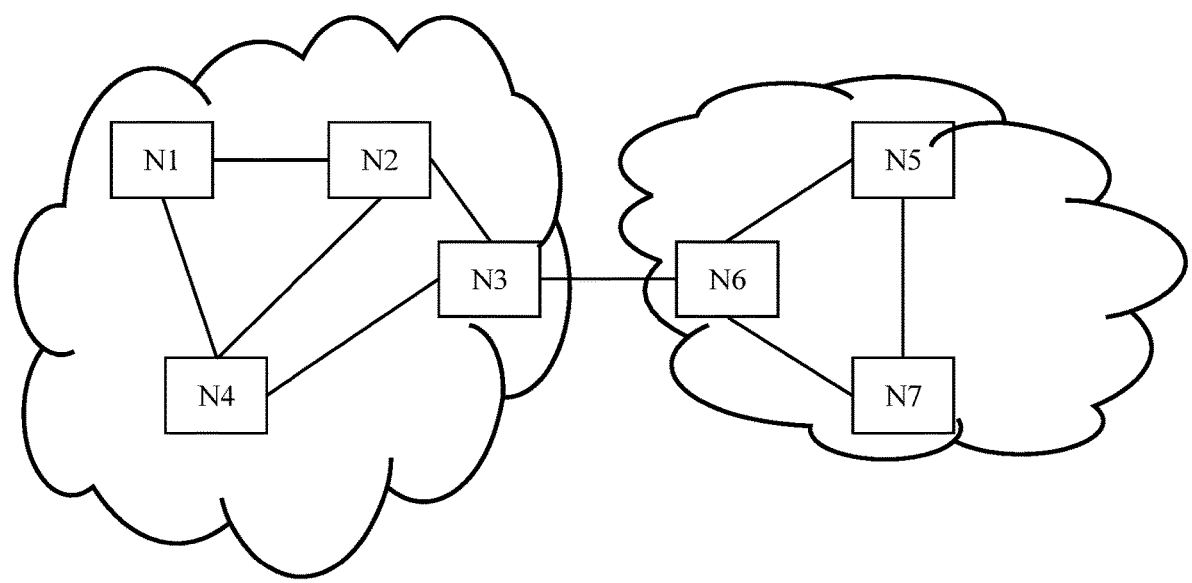
FIG. 1 is an architectural diagram of an OTN according to an embodiment of this application.

Embodiments of this application are applicable to an optical network, for example, an OTN. One OTN is usually constituted by connecting a plurality of devices using an optical fiber, and different topology types such as a linear topology, a ring topology, and a mesh topology may be constituted depending on a specific requirement. An OTN shown in FIG. 1 includes two OTN networks. Each OTN network includes a specific quantity of OTN devices (N1 to N7). Depending on an actual requirement, one OTN device may have different functions. Generally, OTN devices are classified into an optical-layer device, an electrical-layer device, and a photoelectric hybrid device. The optical-layer device is a device capable of processing an optical-layer signal, for example, an optical amplifier (OA) or an optical add-drop multiplexer (OADM). The OA may also be referred to as an optical line amplifier (OLA), and is mainly configured to amplify an optical signal, to support a longer transmission distance while specific performance of the optical signal is ensured. The OADM is configured to perform space transformation on an optical signal such that the optical signal may be output from different output ports (which are also referred to as directions sometimes). Based on different capabilities, OADMs may be classified into a fixed OADM (FOADM), a reconfigurable OADM (ROADM), and the like. The electrical-layer device is a device capable of processing an electrical-layer signal, for example, a device capable of processing an OTN signal. The photoelectric hybrid device is a device capable of processing an optical-layer signal and an electrical-layer signal. It should be noted that, depending on a specific integration requirement, one OTN device may be integrated with a plurality of different functions. The technical solutions provided in this application are applicable to OTN devices in different forms and at different integration levels.

It should be noted that a data frame used by the OTN device in this embodiment of this application may be an OTN frame, and is used to carry various types of service data. This can implement management and monitoring of service data. The OTN frame may be an ODUk, an ODUCn, an ODUflex, an optical channel transport unit (OTU) k, an OTUCn, a FlexO frame, or the like. The data frame may alternatively have another frame structure applicable to the optical network. In addition to being applied to an inter-domain link in FIG. 1, namely, N1 to N2, the FlexO frame may be applied to an intra-domain network, for example, an OTN path including a head node, one or more intermediate nodes, and a last node.

Figure 2:
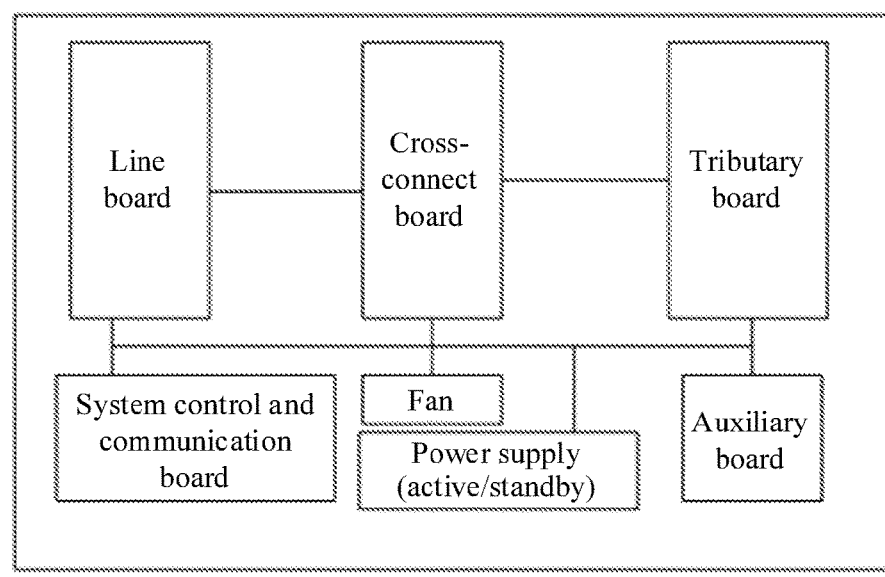
FIG. 2 is a schematic structural diagram of an OTN device according to an embodiment of this application.

FIG. 2 is a possible schematic diagram of a hardware structure of an OTN device. The OTN device herein may be the OTN nodes (N1 to N7) in FIG. 1. Specifically, one OTN device includes a power supply, a fan, and an auxiliary board, and may further include a tributary board, a line board, a cross-connect board, an optical layer processing board, and a system control and communication board.

It should be noted that each device may further include boards of different types and different quantities depending on a specific requirement. For example, a network device serving as a core node may not have a tributary board. A network device serving as an edge node may have a plurality of tributary boards. The power supply is configured to supply power to the OTN device, and may include an active power supply and a standby power supply. The fan is configured to dissipate heat of the device. The auxiliary board is configured to provide an auxiliary function, for example, provide an external alarm or access an external clock. The tributary board, the cross-connect board, and the line board are mainly configured to process an electrical-layer signal of an OTN. The tributary board is configured to implement receiving and sending of various client services, for example, a synchronous digital hierarchy (SDH) service, a packet service, an Ethernet service, and a forward service. Further, the tributary board may be divided into a client-side optical module and a signal processor. The client-side optical module may be an optical transceiver, and is configured to receive and/or send service data. The signal processor is configured to map service data to a data frame and demap the service data from the data frame. The cross-connect board is configured to exchange a data frame, and complete exchange of one or more types of data frames. The line board mainly processes a line-side data frame. Specifically, the line board may be divided into a line-side optical module and a signal processor. The line-side optical module may be a line-side optical transceiver, and is configured to receive and/or send a data frame. The signal processor is configured to implement multiplexing and demultiplexing of a data frame on a line side or mapping and demapping of the data frame on the line side. The system control and communication board is configured to implement system control and communication. Specifically, information may be collected from different boards using a backplane, or a control instruction is sent to a corresponding board. It should be noted that, unless otherwise specified, there may be one or more specific components (for example, the signal processor). This is not limited in this application. It should be further noted that a type of a board included in a device and a specific function design of a board and a quantity of boards are not limited in this embodiment of this application.

In the following, some terms in this application are described in order to help a person skilled in the art have a better understanding.

(1) "A plurality of" refers to two or more than two. The term "and/or" describes an association relationship for describing associated objects and represents that three relationships may exist. For example, A and/or B may represent the following three cases only A exists, both A and B exist, and only B exists. In addition, it should be understood that, in the description of this application, words such as "first" and "second" are merely used for distinction and description, and shall not be understood as an indication or implication of relative importance or an indication or implication of a sequence.

(2) Upstream or downstream. Data is transmitted from a node A to a destination node B, and passes through a node M, where the node M is located in the middle of the node A and the node B in a data transmission direction. Therefore, the node A is in an upstream direction of the node B, and the node B is in a downstream direction of the node M.

(3) Mathematical symbols "*", "%", and "⌊ ⌋" mentioned in the embodiments of this application indicate a multiplication sign, remainder calculation, and rounding down, respectively. For example, if A=3.9, ⌊A⌋=3.

Figure 3:
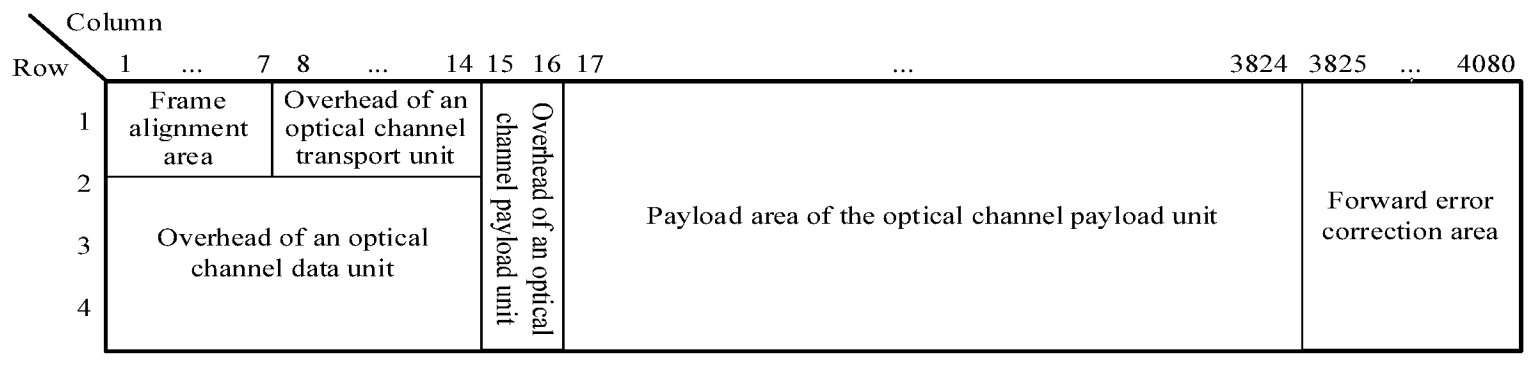

(4) As shown in FIG. 3, an OTN frame may have a structure of 4×4080 bits (bit), that is, 4 rows×4080 columns. The OTN frame structure includes a frame alignment area, an OTU overhead (OH), an ODU OH, an optical channel payload unit (OPU) OH, an OPU payload area, and an FEC area. First 16 columns are overhead bytes, last 256 columns are the FEC area, and 3808 columns in the middle are the payload area.

A frame alignment overhead may include two parts a frame alignment signal (FAS) and a multiframe alignment signal (MFAS). A plurality of OTN frames constitute one OTN multiframe. For example, eight OTN frames constitute one OTN multiframe.

An OPUk is used to carry service data, and includes an OPU payload area and an OPU OH, where k represents a rate level of an OPU, and k=1, 2, 3, and 4 respectively correspond to rates of 2.5 gigabits per second (G), 10G, 40G, and 100G. k=flex, namely, an OPUflex, may correspond to any rate level and is used to carry only a service. K=Cn, namely, an OPUCn, corresponds to a rate level of n times of 100G.

An ODUk is used to support an information structure of the OPUk, and includes the OPUk and an ODUk OH. Similarly, a capacity of the ODUk is distinguished by k. An ODUflex includes the OPUflex and an ODUflex OH. An ODUCn includes the OPUCn and an ODUCn OH.

An OTUk includes the ODUk, the FEC area, and an OTUk OH. An OTUCn includes the ODUCn and an OTUCn OH, and does not include the FEC area.

(5) The OTN frame may alternatively be a FlexO frame. The FlexO frame may be a FlexO-SR interface frame or a FlexO-long reach interface (LR) frame. Subsequently, for ease of description, in subsequent description of the embodiments of this application, the OTN frame structure shown in FIG. 3 is referred to as a first OTN frame.

The FlexO-SR frame is used as an example.

Figure 4:
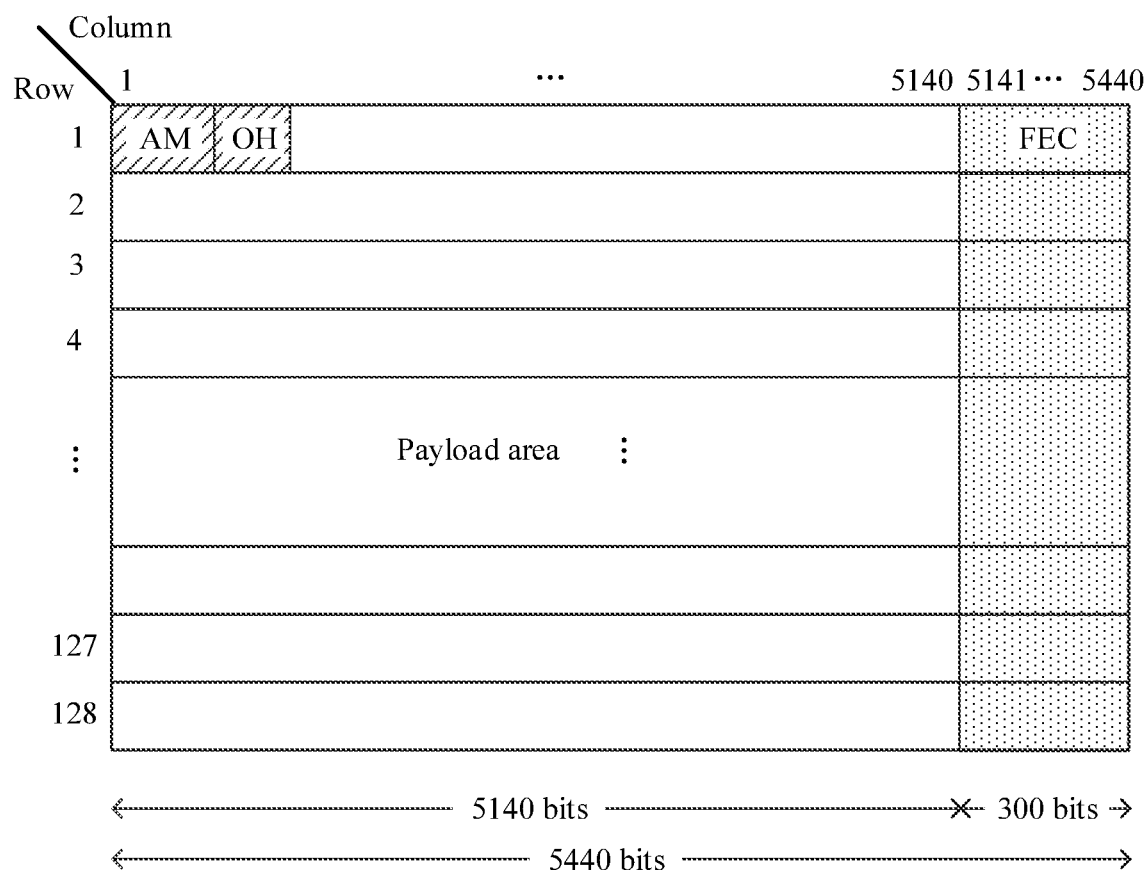
FIG. 4 is a schematic structural diagram of a FlexO-short reach (SR) frame according to an embodiment of this application.

A structure of the FlexO-SR frame is shown in FIG. 4, and the FlexO-SR frame has a structure of 128×5440 bits. A structure of a first row of 5440 bits in the frame structure includes an alignment marker (AM) area and an OH area. All last 300 bits of 5440 bits of each row constitute an FEC area. Except the AM area, the overhead area, and the FEC area, remaining bits constitute a payload area.

In this embodiment of this application, a plurality of FlexO-SR frames may constitute one FlexO-SR multiframe. For example, if eight FlexO-SR frames constitute one FlexO-SR multiframe, overheads of the eight FlexO-SR frames may be combined to constitute an overhead structure of the FlexO-SR multiframe. Specifically, an MFAS may be defined in the overhead area to indicate a multiframe.

Figure 5:
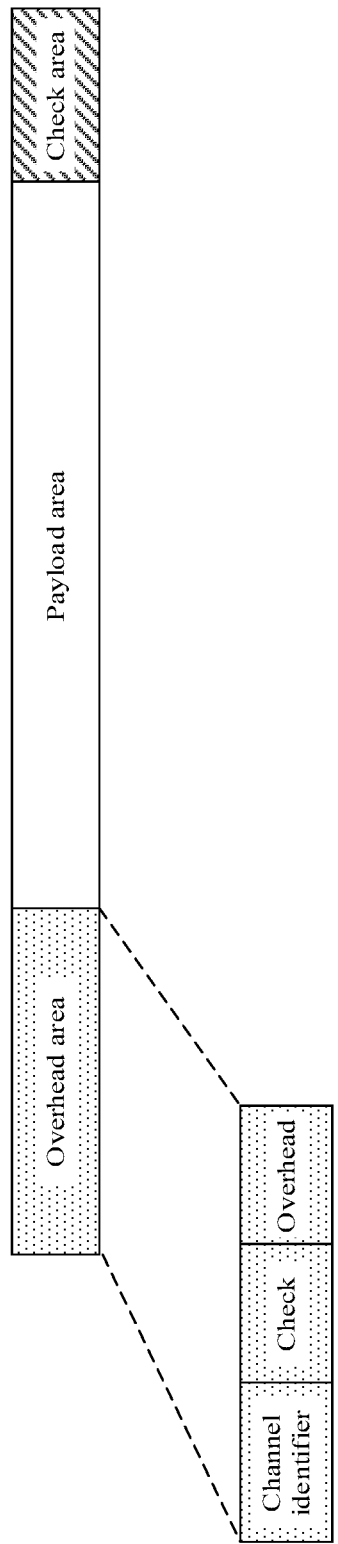
FIG. 5 is a schematic structural diagram of a code block according to an embodiment of this application.

(6) An embodiment of this application provides a frame structure of a smaller granularity relative to a data frame. The frame structure is carried by the data frame, and the structure may be referred to as a code block. In an embodiment, the data frame is divided into a plurality of code blocks. Certainly, the structure may alternatively be named another name. This is not further limited in this embodiment of this application. A structure of the code block is shown in FIG. 5. A quantity of occupied bits may be defined for the code block depending on a requirement, for example, 192 bytes are occupied, that is, 192×8=1536 bits are occupied. Alternatively, 240 bytes are occupied, that is, 240×8=1920 bits are occupied, or 128 bits are occupied, or the like. The quantity of bits occupied by the code block is not further limited in this embodiment of this application, and it only needs to be ensured that the quantity of bits occupied by the code block is less than or equal to half of a quantity of bits occupied by a payload area included in the data frame. The code block may include a payload area and an overhead area. The overhead area may also be referred to as a label area, or may be named another name. This is not further limited in this embodiment of this application. The payload area is used to carry service data, and the overhead area is used to carry overhead information required to transmit the service data.

Optionally, the code block may further include a check area, and the check area is used to indicate correctness of the service data carried in the payload area of the code block and correctness of the information included in the overhead area. For example, a cyclic redundancy check (CRC) mode is used.

The overhead area of the code block includes a channel identifier field, and the channel identifier field is used to carry identification information that identifies the service data. The identification information in this embodiment of this application may also be referred to as a label. For example, the identification information is a value used to indicate a port from which the service data comes. Alternatively, the identification information may be port information of the port from which the service data comes and/or routing information of the service data, or other information used to identify the service data is applicable to this embodiment of this application.

Optionally, the overhead area may further include at least one of the following a check field and an overhead field. The check field is used to check correctness of the code block, for example, correctness of the service data carried by the code block, or correctness of one or several fields. The overhead field is mainly used to manage and monitor the service data in the payload area.

Figure 6:
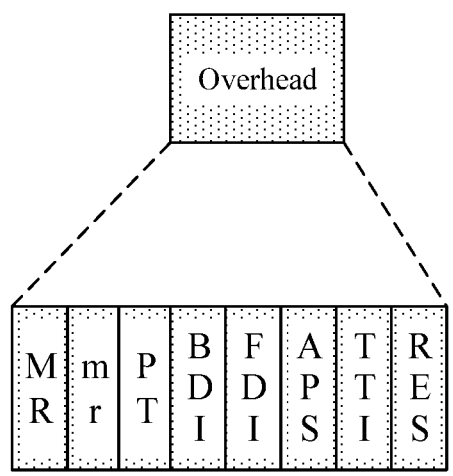
FIG. 6 is a schematic diagram of an overhead field according to an embodiment of this application.

Optionally, referring to FIG. 6, the overhead field may include at least one of a large multiframe indication, a small multiframe indication, a service type indication, a backward defect indication, a forward defect indication, an automatic protection switching overhead, and a trail trace byte. To reduce a resource occupied by the overhead field, each item in the overhead field may occupy only one bit. Certainly, a quantity of bits occupied by each item of the overhead field may be increased depending on a requirement.

The large multiframe indication is represented by MR in FIG. 6, where the large multiframe indication is used to indicate a period of one large multiframe, the large multiframe includes M consecutive code blocks, and M is a positive integer.

The small multiframe indication is represented by mr in FIG. 6, where the small multiframe indication is used to indicate a period of one small multiframe, the small multiframe includes N consecutive code blocks, and N is a positive integer less than M.

The service type indication is represented by PT in FIG. 6, where the service type indication is used to indicate a mapping mode used for mapping the service data to the code block. For example, PT=0 indicates that a packet-type service mapping mode is used, and PT=1 indicates that a CBR service mapping mode is used. Certainly, when a quantity of bits occupied by the PT is not 1, another marking manner may be used to indicate which mapping mode is used. This is not further limited in this application. For example, when the PT occupies two bits, PT=00 may be used to indicate that a packet-type service mapping mode is used, and PT=01 may be used to indicate that a CBR service mapping mode is used.

The backward defect indication (BDI) is used to indicate that a detected signal fail status is transmitted in an upstream direction, and the backward defect indication is represented by a BDI in FIG. 6.

The forward defect indication is used to indicate that a detected signal fail status is transmitted in a downstream direction, and the forward defect indication is represented by an FDI in FIG. 6.

The automatic protection switching (APS) overhead is used to carry transmission protection switching protocol information, and is represented by APS in FIG. 6. In an example, 32 bits are required to transmit APS. Therefore, when each code block has only one bit used to transmit the APS, a small multiframe period of 32 code blocks may be configured such that the APS may be transmitted using the small multiframe period.

The trail trace byte is used to carry a trail trace identifier, and the trail trace identifier (TTI) is represented by a TTI in FIG. 6. In an example, 64 bytes (512 bits) are required to transmit one TTI. Therefore, when each code block has only one bit used to transmit the TTI, a large multiframe period of 512 code blocks may be configured such that the TTI may be transmitted using the large multiframe period. It should be noted that the large multiframe period and the small multiframe period are used to indicate fields that use different multiframe periods. In practical use, a single multiframe period or a plurality of multiframe periods may be used depending on a specific requirement. This is not limited in the present disclosure.

The overhead field may further include a reserved (RES) byte, and is configured depending on a future requirement.

Optionally, in this embodiment of this application, the payload area included in the code block may carry data of a packet-type service, for example, an Ethernet service and an enhanced common public radio interface (eCPRI) service.

Alternatively, the payload area included in the code block may carry data of a CBR service, for example, a plesiochronous digital hierarchy (PDH), a SDH, an Ethernet service, a CPRI service, an eCPRI service, a fiber channel (FC) service, and a passive optical network (PON) service.

In this embodiment of this application, when a code block is configured for a data frame, if a quantity of bits occupied by a payload area of one data frame is not enough to be divided exactly by a quantity of bits occupied by the code block, a quantity of remaining bits obtained after exact division may be inserted into fixed padding, and places of the fixed padding are not used to transmit service data. For example, a code block occupies K bits, and a payload area included in one data frame occupies L bits, and L % K=S1, where both K and L are positive integers, and S1 is an integer greater than 0. In this case, S1 bits in the data frame are used for fixed padding.

In addition, when a quantity of bits occupied by a payload area of one data frame is not enough to be divided exactly by a quantity of bits occupied by a code block, if a quantity of bits occupied by several data frames can be divided exactly by the quantity of bits occupied by the code block, the code block may be configured for the several data frames as a whole. For example, a code block occupies K bits, a payload area of one data frame occupies L bits, and P*L/K=W, where both K and L are integers greater than 0, P is an integer greater than or equal to 1, and W is an integer greater than 0. That is, W code blocks are exactly configured for P FlexO frames.

An example in which a code block that occupies 192 bytes is configured for the first OTN frame shown in FIG. 3, an example in which a code block that occupies 192 bytes is configured for the FlexO-SR frame shown in FIG. 4, an example in which a code block that occupies 240 bytes is configured for the first OTN frame shown in FIG. 3, and an example in which a code block that occupies 240 bytes is configured for the FlexO-SR frame shown in FIG. 4 are used for description in the following.

The example in which the code block that occupies 192 bytes is configured for the first OTN frame shown in FIG. 3 is used. A payload area (namely, an OPU) of the first OTN frame occupies 3808*4 bytes.

Figure 7A:
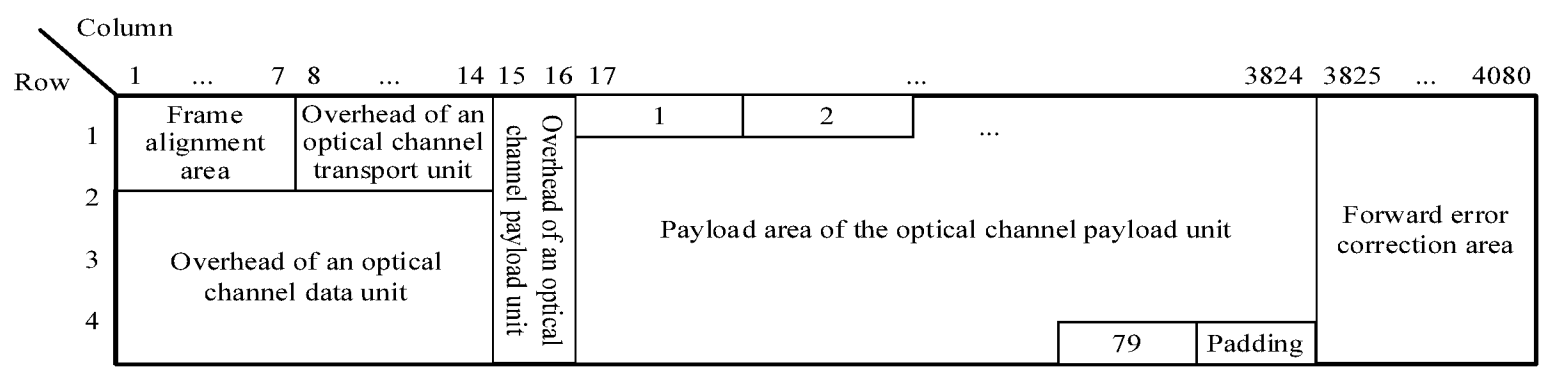

An optional manner is, referring to FIG. 7A, ⌊3808*4/192⌋=79 code blocks are configured in the payload area of the first OTN frame, and there are remaining (3808*4)%192=64 bytes such that the 64 bytes may be used for fixed padding.

Another optional manner is a multiframe structure of four frames is defined. In this multiframe structure, a code block of 192 bytes is obtained through division, that is, 3808*4*4/192=317. In an embodiment, the multiframe structure is exactly divided into 317 code blocks that occupy 192 bytes without additional fixed padding.

The example in which the code block that occupies 192 bytes is configured for the FlexO-SR frame is used. A size of the FlexO-SR frame is 128*5440/8=87040 bytes, an FEC area occupies 300*128/8=4800 bytes, and an AM and an OH occupy (960+320)/8=160 bytes. Therefore, except the FEC area, the AM, and the OH, the payload area of the FlexO-SR frame occupies 82080 bytes.

Figure 7B:
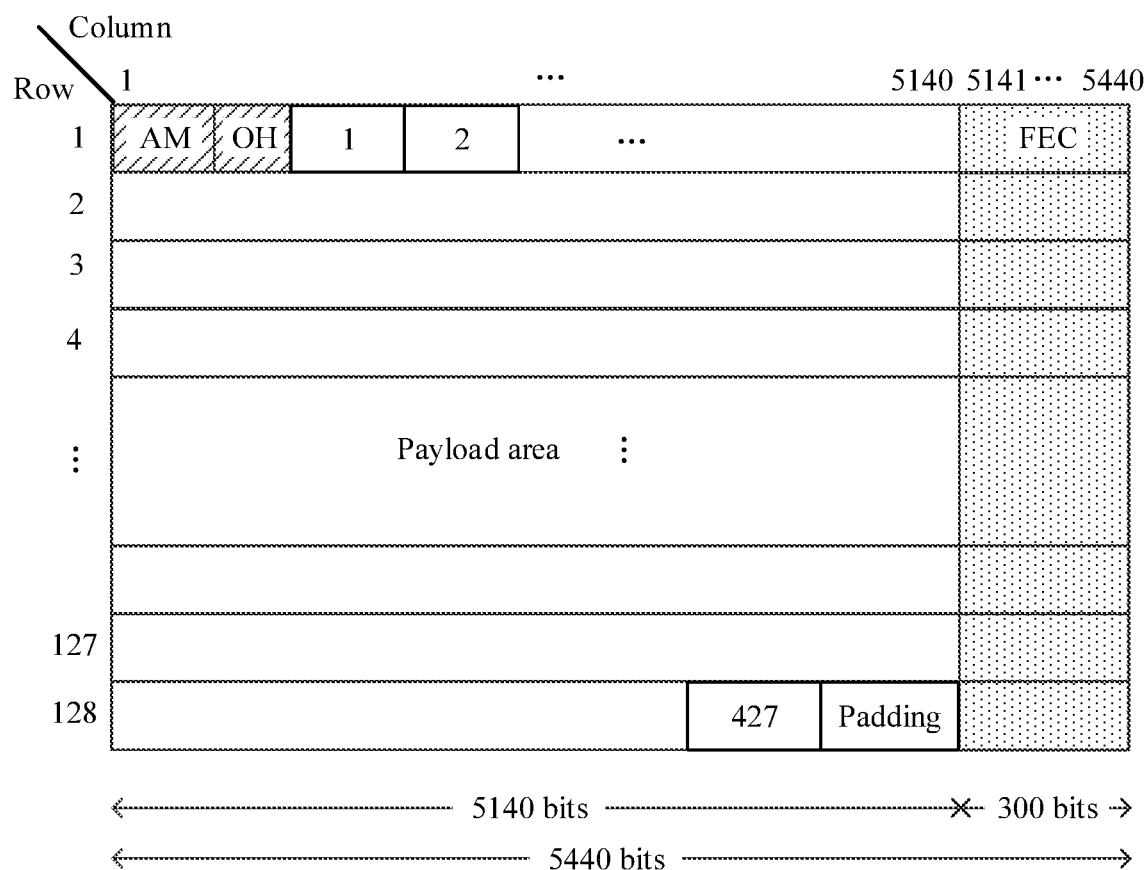
FIG. 7B is a schematic structural diagram of a code block that occupies 192 bytes and is configured for a FlexO-SR frame according to an embodiment of this application.

An optional manner is, referring to FIG. 7B, the 82080 bytes are divided into code blocks of 192 bytes and can be divided into 427 code blocks of 192 bytes in the FlexO-SR frame, and remaining 96 bytes are used for fixed padding and used for padding of invalid data. However, in this solution, carrying efficiency is relatively low, and there is a waste of 96 bytes of invalid bandwidth.

Figure 7C:
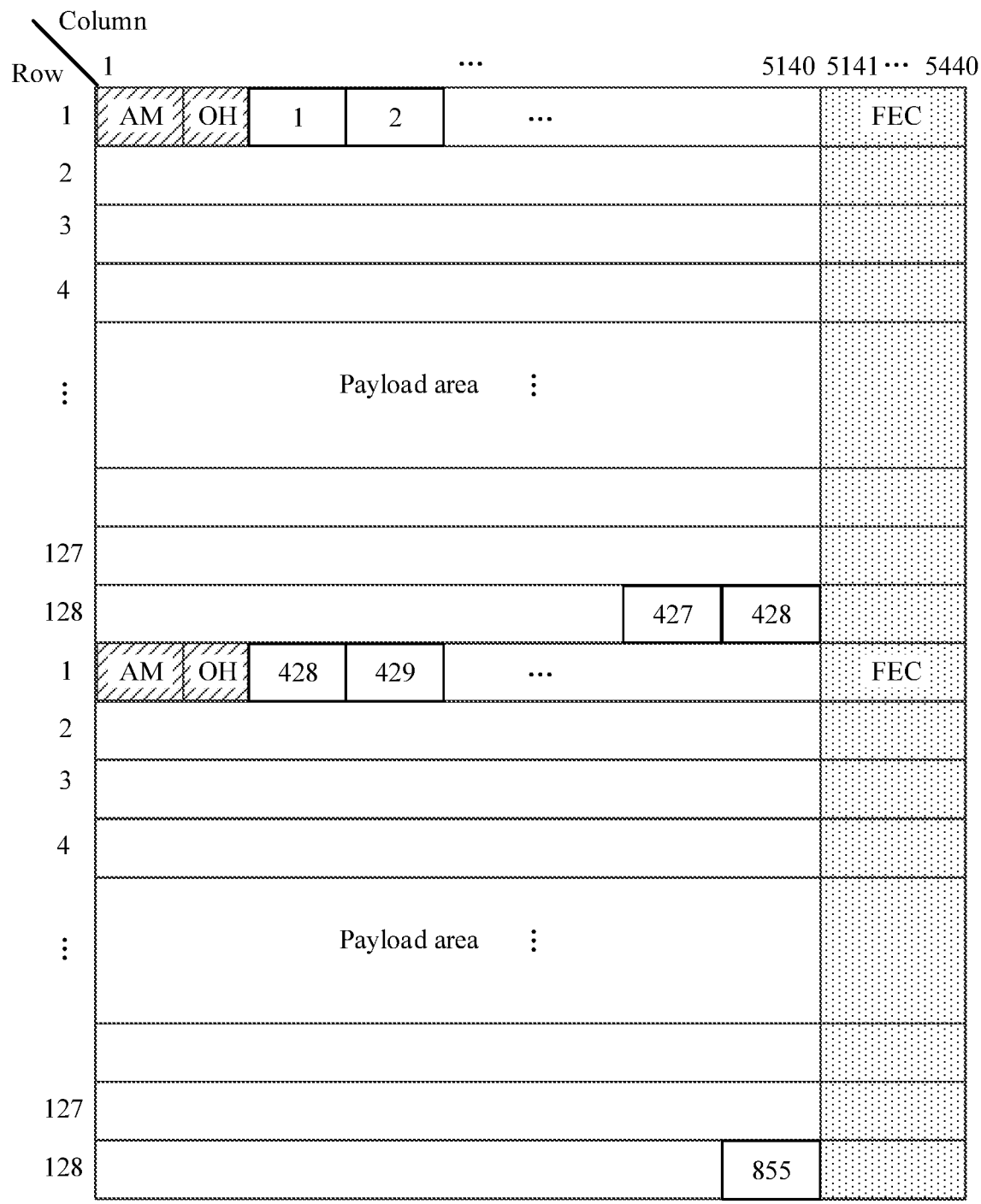
FIG. 7C is a schematic structural diagram of another code block that occupies 192 bytes and is configured for a FlexO-SR frame according to an embodiment of this application.

Another optional manner is, referring to FIG. 7C, a multiframe structure of two frames is defined using an MFAS defined in the current G.709.1 standard protocol. In this FlexO-SR multiframe structure, a code block of 192 bytes is obtained through division, that is, 82080*2*4/192=855. In an embodiment, the FlexO-SR multiframe structure is exactly divided into 855 code blocks that occupy 192 bytes without additional fixed padding.

Figure 8A:
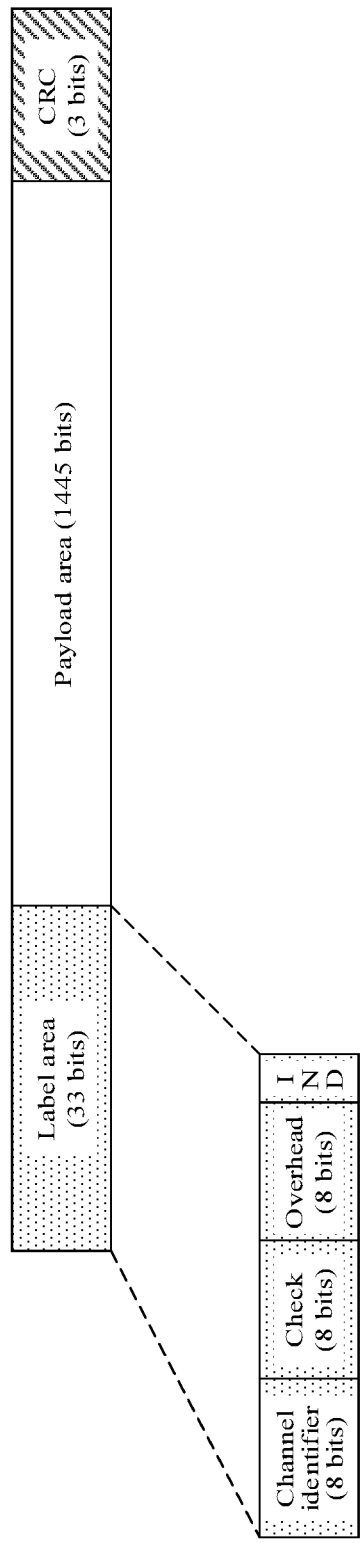
FIG. 8A is a schematic structural diagram of a code block corresponding to a packet-type service according to an embodiment of this application.
Figure 8B:
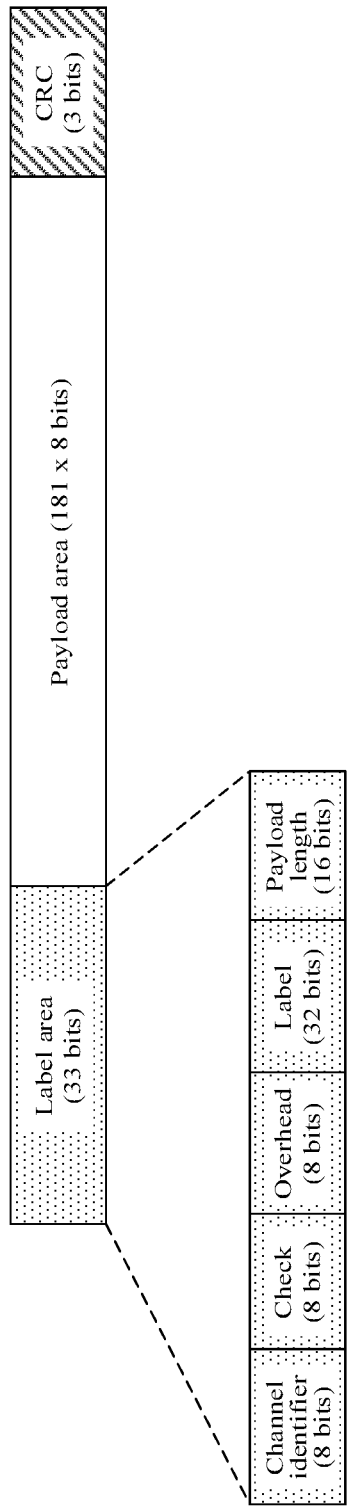
FIG. 8B is a schematic structural diagram of a code block corresponding to a constant bit rate (CBR) service according to an embodiment of this application.

In an example, the following structure may be defined for the code block that occupies 192 bytes. Refer to FIG. 8A and FIG. 8B for details.

FIG. 8A shows an example of a code block structure for a packet-type service. The structure includes a payload area, an overhead area, and a check area. It should be noted that a quantity of bits occupied by each area of the code block mentioned in any embodiment of this application may be configured depending on a requirement. This is not further limited in this application. The overhead area includes a channel identifier field. The overhead area may further include at least one of the following a check field, an overhead field, and an indication (IND) field. The indication field is used to indicate whether the payload area included in the code block carries service data. In addition, it should be noted that a quantity of bits occupied by each field of the code block mentioned in any embodiment of this application may be configured depending on a requirement. This is not further limited in this application. For a definition of the overhead field, refer to FIG. 6. In FIG. 8A, the channel identifier field occupies two bytes (16 bits), the check field occupies one byte (8 bits), and the overhead field occupies one byte (8 bits), the indication field occupies one bit, the payload area occupies 23×65 bits, and the check area occupies one byte (8 bits). For the indication field, for example, when no actual packet-type service data is to be sent in the payload area of the code block, an IND field may be set to "0", and fixed label data such as "0xFF" is added to the payload area of the code block. When packet-type service data is mapped to the payload area of the code block, the IND field may be set to "1". Certainly, another identification manner is used to indicate whether there is actual service data to be sent in the payload area of the code block. This is not further limited in this application.

FIG. 8B shows an example of a code block structure for a CBR service. The structure is different from the code block structure for the packet-type service in that an overhead area of a code block does not include an indication field, but may include a payload length field and/or a timestamp field. The timestamp field may occupy 32 bits, and the payload length field may occupy 16 bits such that a payload area for the CBR service occupies 181 bytes (181×8 bits). The timestamp field is used to indicate a time at which service data is mapped to the code block, and the payload length field is used to indicate a length of the service data carried by the code block.

Figure 9A:
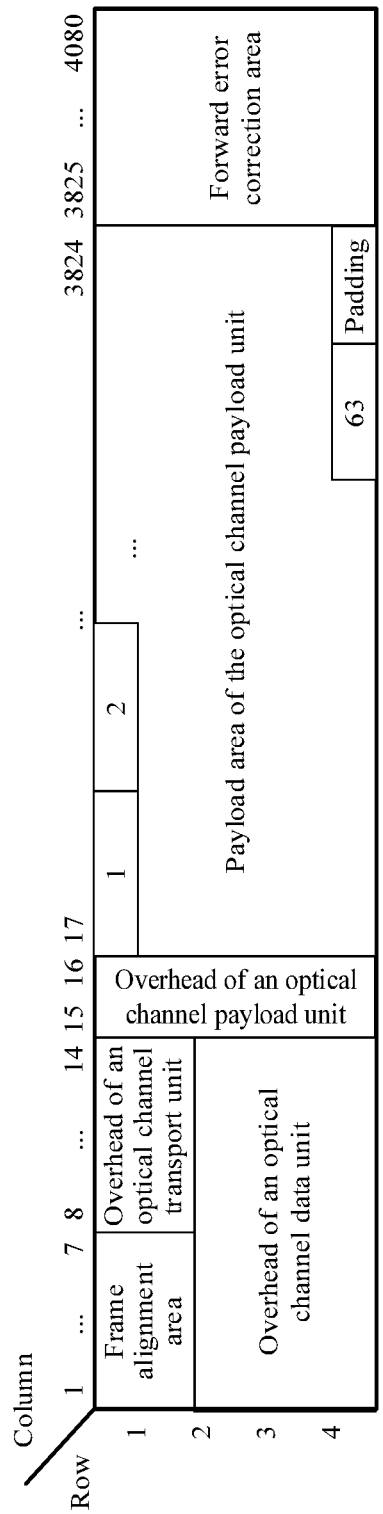
FIG. 9A is a schematic structural diagram of a code block that occupies 240 bytes and is configured for an OTN frame according to an embodiment of this application.

Referring to FIG. 9A, the example in which the code block that occupies 240 bytes is configured for the OTN frame shown in FIG. 3 is used. A payload area (namely, an OPU) of the OTN frame occupies 3808*4 bytes. In this case, ⌊3808*4/240⌋=63 code blocks are configured in the payload area of the OTN frame, and there are remaining (3808*4)%240=112 bytes such that the 112 bytes may be used for fixed padding.

The example in which the code block that occupies 240 bytes is configured for the FlexO-SR frame shown in FIG. 4 is used. A payload area of the FlexO-SR frame occupies 82080 bytes.

Figure 9B:
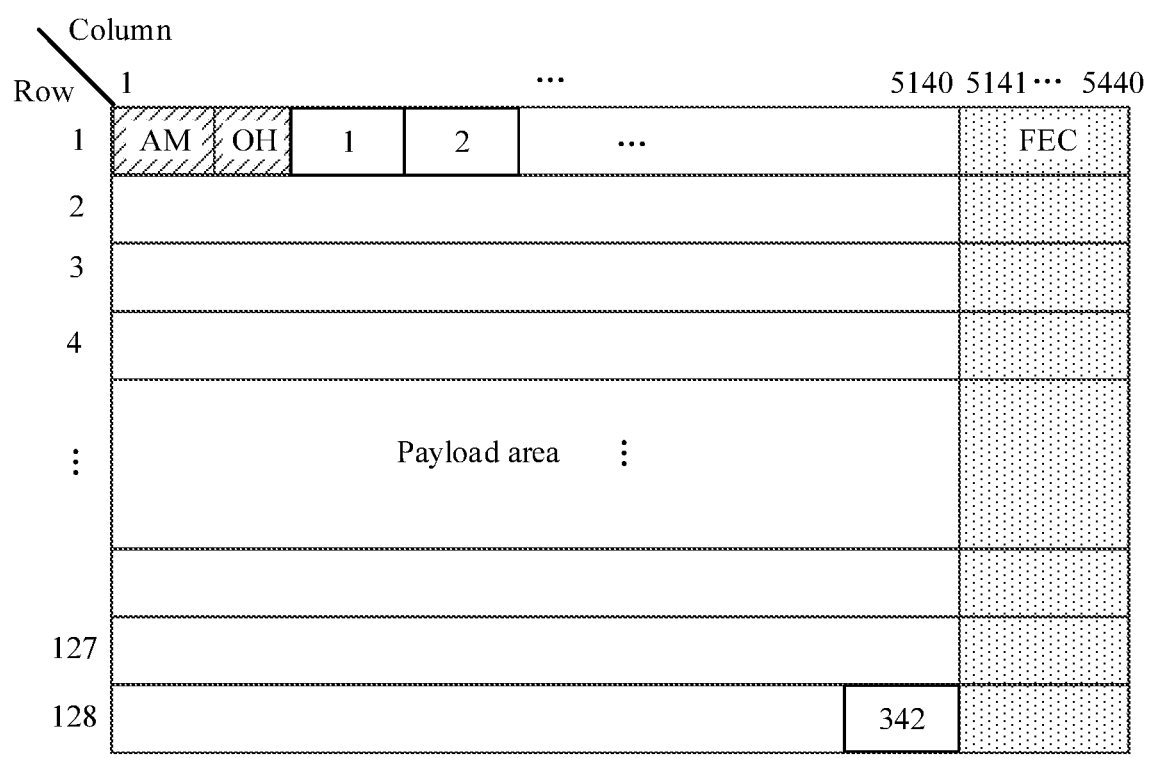
FIG. 9B is a schematic structural diagram of a code block that occupies 240 bytes and is configured for a FlexO-SR frame according to an embodiment of this application.

Referring to FIG. 9B, the 82080 bytes are divided into code blocks of 240 bytes, and one FlexO-SR frame can be exactly divided into 342 code blocks that occupy 240 bytes without additional fixed padding.

In an example, a structure of the code block that occupies 240 bytes (1920 bits) may be configured in a configuration manner similar to the structure of the code block that occupies 192 bytes. For a packet-type service, configuration manners for an overhead area and a check area of the code block of 240 bytes may be the same as configuration manners for an overhead area and a check area of the code block of 192 bytes, and a quantity of bits occupied by a payload area of the code block of 240 bytes is 1879. For a CBR service, the payload area of the code block of 240 bytes occupies 229 bytes.

Existing client-side service data is mapped to a data frame using a time division multiplexing (TDM) mechanism. Specifically, in each data frame, after configuration, a timeslot can be occupied by only a pre-configured port, and remains unchanged in each data frame unless the configuration is changed.

On this basis, the embodiments of this application provide a method and an apparatus for processing service data in an OTN. A code block of a smaller granularity is defined in a data frame, and a channel identifier field is defined in an overhead area of the code block, to provide identification information that carries service data carried in a payload area. Then, before service data is mapped to the data frame, a quantity of code blocks in each data frame that are used to carry the service data and locations of the code blocks are determined depending on a requirement, and then the service data is mapped to the data frame based on the quantity and the locations. In this case, code blocks at a same location in a plurality of consecutive data frames may be occupied by service data from different ports such that flexible configuration of the data frame may be implemented, and data frame transmission flexibility is further improved. Because principles for resolving a problem of the method and the apparatus are similar, mutual reference may be made to implementations of the apparatus and the method, and repeated descriptions are not described.

Figure 10A:
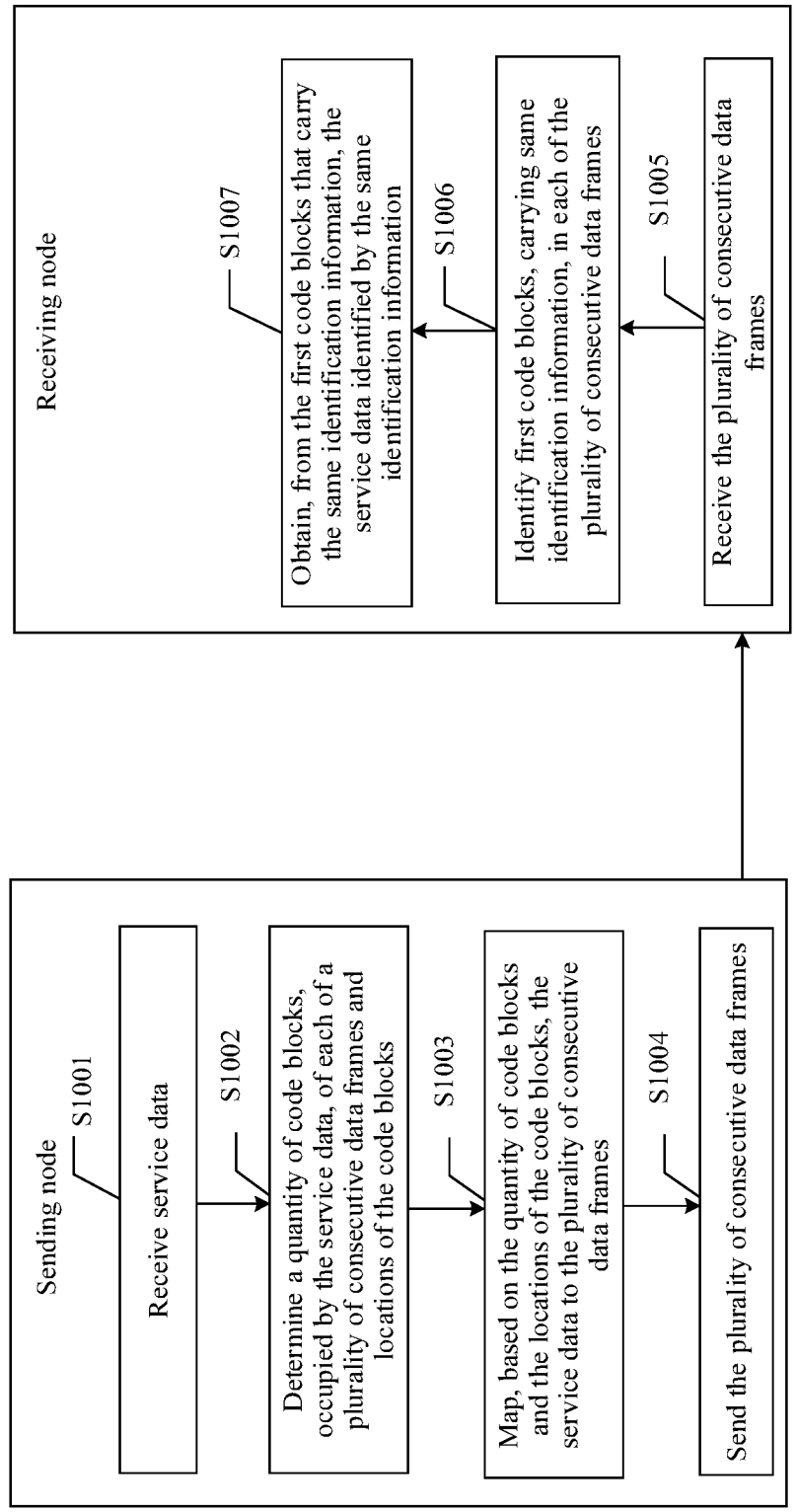
FIG. 10A is a flowchart of a method for processing service data in an OTN according to an embodiment of this application.
Figure 10B:
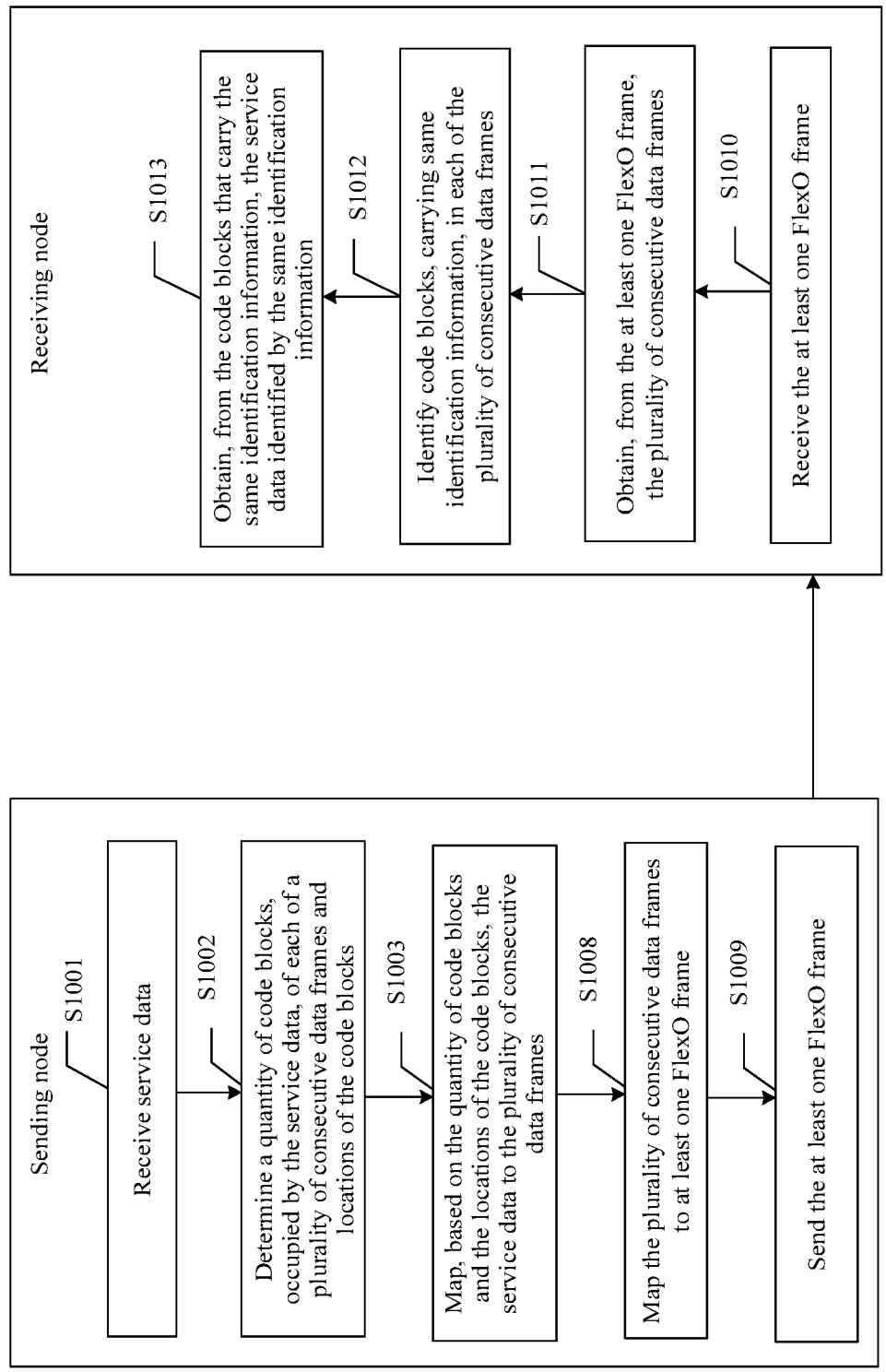
FIG. 10B is a flowchart of another method for processing service data in an OTN according to an embodiment of this application.

FIG. 10A and FIG. 10B each are a flowchart of a method for processing service data in an OTN according to an embodiment of this application. The processing method may be applied to the OTN device shown in FIG. 2. For example, the method may be implemented by the tributary board in the OTN device shown in FIG. 2. Alternatively, the method may be executed by a processing module disposed in the OTN device, or may be executed by a processing chip.

The processing method includes the following steps.

S1001. A sending node (namely, an OTN device on a transmitter side) receives service data, where the service data is to be mapped to a plurality of consecutive data frames. Each data frame includes a fixed quantity of code blocks. Refer to the descriptions of FIG. 7A to FIG. 9B for details.

S1002. The sending node determines a quantity of code blocks, occupied by the service data, of each of the plurality of consecutive data frames and locations of the code blocks. The code block includes a payload area and an overhead area, the payload area of the code block is used to carry the service data, and the overhead area of the code block is used to carry identification information that identifies the service data.

Specifically, the sending node may determine, based on bandwidth of the service data, the quantity of code blocks occupied by the service data and specific locations of these code blocks in a data frame. It should be noted that the sending node may determine a quantity of code blocks, occupied by service data, in a plurality of data frames and locations of the code blocks for one time. Alternatively, the sending node may determine a quantity of code blocks required when one data frame carries service data and required locations of the code blocks for one time. This is not limited in this application.

S1003. The sending node maps, based on the quantity of code blocks and the locations of the code blocks, the service data to the plurality of consecutive data frames.

Specifically, that the sending node maps the service data to the plurality of consecutive data frames based on the quantity of code blocks and the locations of the code blocks may be implemented in the following manner.

The sending node maps the service data to a payload area of each code block corresponding to a location of the code block, and adds identification information used to identify the service data to a channel identifier field of the code block to which the service data is mapped. If an overhead area of the code block further includes an overhead field, the sending node adds management and monitoring information of the service data in the payload area to the overhead field. If the overhead area of the code block further includes a check field, the sending node adds check information used to check integrity of the code block to the check field.

Code block manner used in the embodiments of this application is essentially different from a conventional timeslot manner. The conventional timeslot manner belongs to a TDM mechanism. In an embodiment, in each frame, a timeslot can be occupied by only a port to which the timeslot is allocated, and does not change in consecutive data frames unless timeslot configuration is changed. However, in this embodiment of this application, code blocks (for example, code blocks whose identifiers are "427" in FIG. 7B) at a same location in a plurality of consecutive data frames may be occupied by service data from different ports. Specifically, a channel identifier field of a label area of the code block is used to determine a port whose service data occupies a location of each code block in each data frame. The channel identifier field may be dynamically updated in each data frame. In this embodiment of this application, a data frame is divided into a plurality of code blocks, and a code block structure is defined. A corresponding channel identifier field is defined in the code block. In this way, a function that the data frame is shared by service data from different ports is implemented. Certainly, code blocks at a location in a plurality of consecutive data frames or code blocks at several locations in a plurality of consecutive data frames may also be bundled, and are occupied by service data from a same port.

In a specific implementation of this application, before mapping service data for each data frame, the sending node may determine a quantity of code blocks, occupied by the service data, in one data frame and locations of the code blocks, and then, map the service data to the data frame based on the determined quantity of code blocks and the determined locations of the code blocks. In another specific implementation of this application, the sending node may determine a quantity of code blocks, occupied by one piece of service data, in several consecutive data frames and locations of the code blocks for one time, and subsequently, map the service data the several consecutive data frames based on the quantity and the locations.

The service data in this embodiment of this application generally refers to any type of service data. In this embodiment of this application, a type of service data is described.

Certainly, if the sending node receives service data from a plurality of ports simultaneously, the sending node may determine a quantity of code blocks, occupied by service data corresponding to each port, in one or more data frames and locations of the code blocks, and then, map the service data from the plurality of ports to the one or more data frames.

In addition, it should be noted that a rate of the code block in this embodiment of this application may be less than or equal to 1 Gbps. For example, for an E1 service in a PDH service, the rate of the code block may be set to 2 megabits per second (Mbps). For a Synchronous Transport Module level-1 (STM-1) service in an SDH service, the rate of the code block may be set to 155 Mbps. For a Fast Ethernet (FE) service, the rate of the code block may be set to 100 Mbps. For a Synchronous Transport Module level-4 (STM-4) service in the SDH service, the rate of the code block rate may be set to 622 Mbps or the like. It should be noted that the code block includes an overhead area in addition to a payload area that carries service data. Therefore, the rate of the code block is a rate of the payload area. An actual overall rate of the code block is slightly higher than a rate of service data that matches the code block.

Figure 11A:
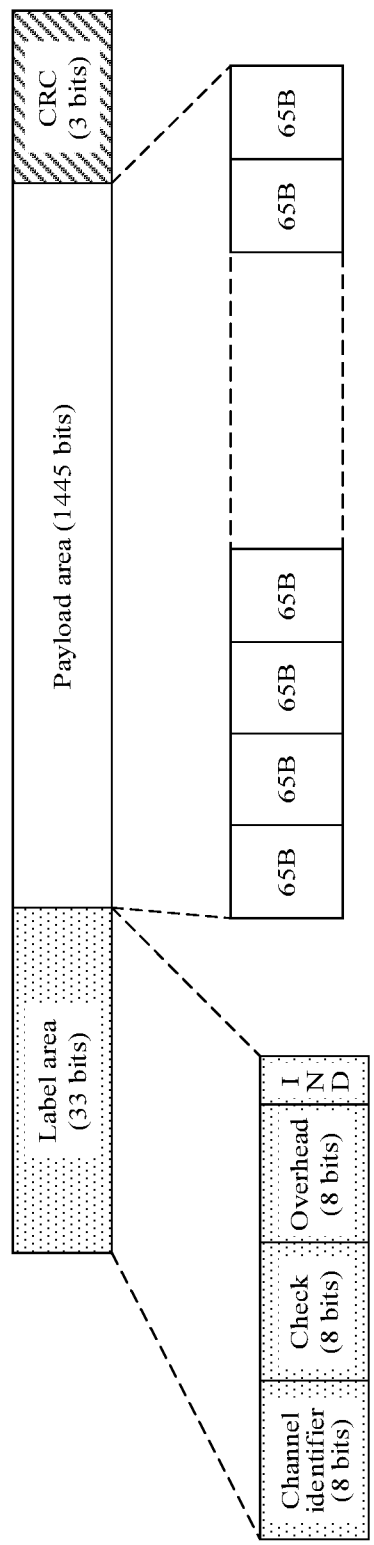
FIG. 11A is a schematic structural diagram of a code block with 192 bytes corresponding to a packet-type service according to an embodiment of this application.
Figure 11B:
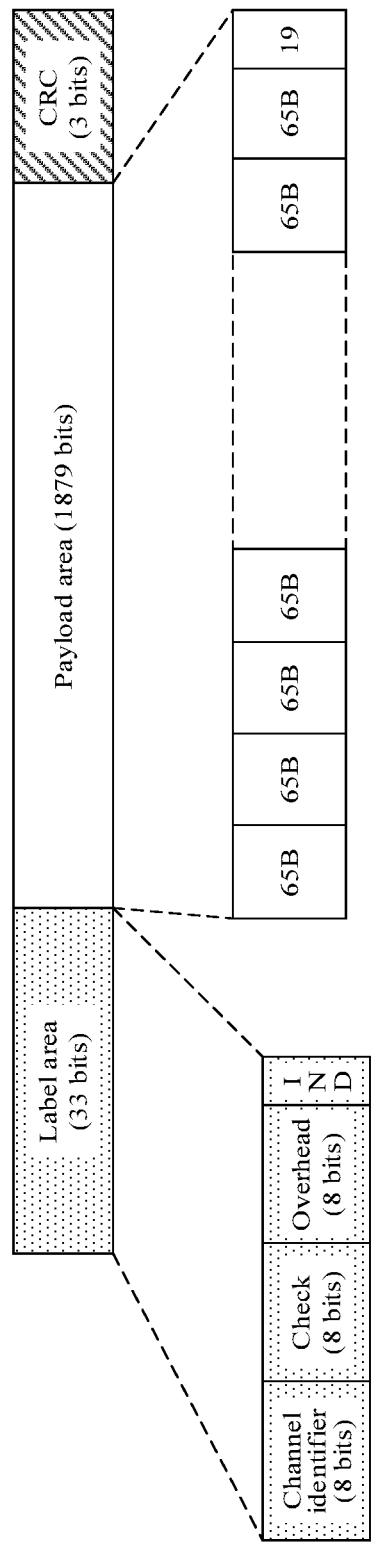
FIG. 11B is a schematic structural diagram of a code block that occupies 240 bytes and corresponds to a CBR service according to an embodiment of this application.

Optionally, when the service data carries a packet-type service, after receiving packet-type service data, the sending node parses the packet-type service data, deletes interframe space of the packet-type service data, and converts the packet-type service into an Ethernet code stream. For example, each code block of the Ethernet code stream is 65B. The code block of 192 bytes shown in FIG. 8A is used as an example. A quantity of bits occupied by the payload area included in the code block of 192 bytes is 1445, and one code block of 192 bytes can carry 23 code blocks of 65B. In this case, every 23 code blocks in the Ethernet code stream may be mapped to a payload area included in one code block of 192 bytes, as shown in FIG. 11A. A code block of 240 bytes is used as an example. For example, if a quantity of bits occupied by a payload area included in the code block of 240 bytes is 1879, and the 1879 bits cannot be evenly divided by the Ethernet code stream of 65B. That is, $\lfloor 1879/65 \rfloor =28$ and $1879\% 65=59$. In this case, every 28 code blocks in the Ethernet code stream may be mapped to a payload area included in one code block of 240 bytes, and remaining 59 bits are inserted by fixed padding, where the fixed padding indicates that the 59 bits are invalid. Refer to FIG. 11B.

Optionally, when the service data carries a packet-type service, whether a code block that is allocated for service data of a port is occupied may be indicated using an indication field of an overhead area of the code block. If a payload area of a code block that is allocated for the service data is not occupied by the service data, IND=0 may be configured. If a payload area of a code block that is allocated for the service data is occupied by the service data, IND=1 may be configured.

One data frame may include one OTN frame (for example, the first OTN frame shown in FIG. 3 or the FlexO frame shown in FIG. 4) or a plurality of OTN frames.

For a case in which one data frame includes one OTN frame. If a quantity of bits occupied by a payload area of one OTN frame is not enough to be divided exactly by a quantity of bits occupied by a code block, fixed padding may be configured in the OTN frame. For example, a code block occupies K bits, and a payload area included in one OTN frame occupies L bits, and L % K=S1, where both K and L are positive integers, and S1 is an integer greater than 0. In this case, after the service data is mapped to the OTN frame, and before the OTN frame is sent, remaining S1 bits in the payload area included in the OTN frame are inserted by fixed padding.

For a case in which one data frame may include a plurality of consecutive OTN frames. If a quantity of bits occupied by a payload area of one OTN frame is not enough to be divided exactly by a quantity of bits occupied by a code block, the plurality of consecutive OTN frames (one OTN multiframe) may form one data frame such that a quantity of bits occupied by a payload area of one OTN multiframe can be divided exactly by a quantity of bits occupied by a code block. For example, each code block occupies K bits, the payload area included in the OTN multiframe occupies L bits, and P*L/K=W, where both K and L are integers greater than 0, P is an integer greater than or equal to 1, and W is an integer greater than 0. In this case, in step S1002, the sending node determines a quantity of code blocks occupied by the service data, of each of the plurality of consecutive data frames and the locations of the code blocks may be implemented in the following manner. The quantity of code blocks used to carry the service data and the locations of the code blocks are determined in the W code blocks included in the P OTN frames, and then the service data may be mapped to the P OTN frames based on the determined quantity of code blocks and the determined locations of the code blocks.

In a possible implementation, referring to FIG. 10A, an example in which the data frame is a FlexO frame is used. After mapping the service data to the plurality of consecutive data frames, the sending node performs S1004.

S1004. The sending node sends the plurality of consecutive data frames.

S1005. A receiving node (namely, an OTN device on a receiver side) receives the plurality of consecutive data frames.

The data frame includes a fixed quantity of code blocks, an overhead area of each code block includes a channel identifier field, and the channel identifier field includes identification information used to identify the service data.

The identification information carried by the channel identifier field may be port information that identifies a service data port and routing information. In this case, when obtaining a code block that carries the channel identifier field, the OTN device may determine, based on the port information and the routing information, a port from which the service data carried by the code block comes.

S1006. The receiving node identifies first code blocks, carrying same identification information, in each of the plurality of consecutive data frames.

S1007. The receiving node obtains, from the first code blocks that carry the same identification information, service data identified by the same identification information.

In another possible implementation, referring to FIG. 10B, an example in which the data frame is the first OTN frame shown in FIG. 3 is used. After mapping the service data to the plurality of consecutive data frames, the sending node performs S1008.

S1008. The sending node maps the plurality of consecutive data frames to at least one FlexO frame.

S1009. The sending node sends the at least one FlexO frame.

S1010. A receiving node receives the at least one FlexO frame.

S1011. The receiving node obtains, from the at least one FlexO frame, the plurality of consecutive data frames. Each data frame includes a fixed quantity of code blocks, each code block includes a payload area and an overhead area, the payload area is used to carry service data, and the overhead area includes identification information used to identify the service data.

S1012. The receiving node identifies code blocks, carrying same identification information, in each of the plurality of consecutive data frames.

S1013. The receiving node obtains, from the code blocks that carry the same identification information, service data identified by the same identification information.

Specifically, after restoring a code block in each FlexO frame, the receiving node determines, based on a channel identifier field of an overhead area of the code block, code blocks with same identification information included in the channel identifier field, determines integrity of the code block using a check field, determines a service mapping mode using a PT in an overhead field, and restores, according to the service mapping mode, service data from the code blocks with the same identification information.

In this embodiment of this application, the channel identifier field may be pre-configured or configured dynamically. In a specific example, a data table may be pre-configured between the sending node and the receiving node, and the data table includes a correspondence between a label and a port number. The sending node determines, according to the configured data table, a label corresponding to a port number of a port from which to-be-sent service data comes, and adds the label to a channel identifier field of a code block occupied by the service data. Certainly, the port number may alternatively be directly used to configure a forwarding data table.

Optionally, when the sending node sends the FlexO frame to the receiving node, the FlexO frame may also pass through an intermediate node. A data table is also configured on the intermediate node. The data table on the intermediate node may include a correspondence between an ingress label corresponding to a source port and an egress label corresponding to a destination port. After receiving the FlexO frame, the intermediate node updates, according to the configured data table, a label included in a channel identifier field of each code block in the FlexO frame.

After receiving the FlexO frame sent by the sending node or the intermediate node, the receiving node can determine, using the configured data table, code blocks in the FlexO frame that carry service data from a same port.

Figure 12:
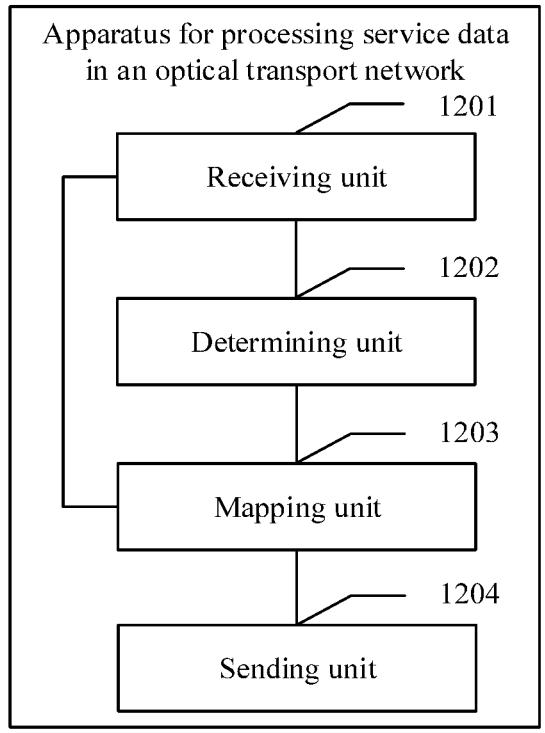
FIG. 12 is a schematic diagram of an apparatus for processing service data in an OTN according to an embodiment of this application.

An embodiment of this application further provides an apparatus for processing service data in an OTN. The apparatus is applied to a sending node, namely, an OTN device on a transmitter side. The apparatus may be specifically a processor, a chip, a chip system, a functional module used for sending, or the like, in the OTN device. Referring to FIG. 12, the apparatus may include a receiving unit 1201, a determining unit 1202, a mapping unit 1203, and a sending unit 1204. The receiving unit 1201 is configured to perform S1001, the determining unit 1202 is configured to perform S1002, the mapping unit 1203 is configured to perform S1003 or is configured to perform S1003 and S1008, and the sending unit 1204 is configured to perform S1004 or S1009. Repeated descriptions not described herein.

Figure 13:
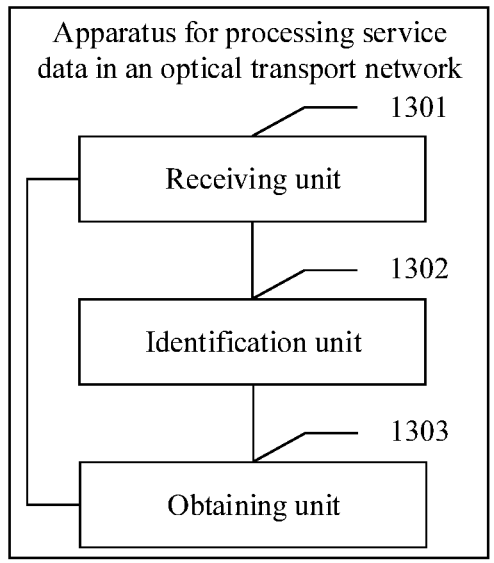
FIG. 13 is a schematic diagram of another apparatus for processing service data in an OTN according to an embodiment of this application.

An embodiment of this application further provides another apparatus for processing service data in an OTN. The apparatus is applied to a receiving node, namely, an OTN device on a receiver side. The apparatus may be specifically a processor, a chip, a chip system, a functional module used for receiving, or the like, in the OTN device. Referring to FIG. 13, the apparatus may include a receiving unit 1301, an identification unit 1302, and an obtaining unit 1303. The receiving unit 1301 is configured to perform S1005 or S1010, the identification unit 1302 is configured to perform S1006 or configured to perform S1011 and S1012, and the obtaining unit 1303 is configured to perform S1007 or S1013. Repeated descriptions not described herein.

In the embodiments of this application, unit division is exemplary, and is merely a logical function division. In an embodiment, another division manner may be used. In addition, functional units in the embodiments of this application may be integrated into one processor, or each of the units may exist alone physically, or two or more units are integrated into one unit. The integrated unit may be implemented in a form of hardware, or may be implemented in a form of a software functional unit.

Figure 14:
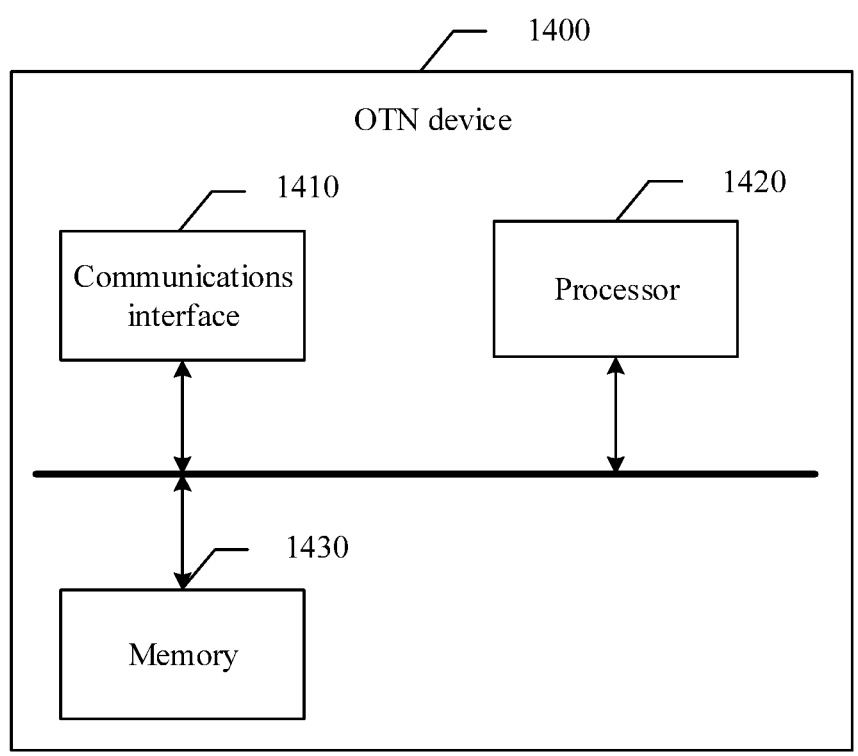
FIG. 14 is a schematic diagram of an OTN device 1400 according to an embodiment of this application.

An embodiment of this application further provides another structure of an OTN device. As shown in FIG. 14, an OTN device 1400 may include a communications interface 1410, a processor 1420, and a memory 1430. The OTN device may be applied to a sending node, or may be applied to a receiving node.

When the OTN device is applied to a sending node, the receiving unit 1201, the determining unit 1202, the mapping unit 1203, and the sending unit 1204 that are shown in FIG. 12 may all be implemented by the processor 1420. The processor 1420 receives service data through the communications interface 1410, and is configured to implement the method performed by the sending node in FIG. 10A and FIG. 10B. In an implementation process, in steps of the processing procedure, the method performed by the sending node in FIG. 10A and FIG. 10B may be completed using an integrated logic circuit of hardware in the processor 1420 or an instruction in a form of software.

When the OTN device is applied to a receiving node, the receiving unit 1301, the identification unit 1302, and the obtaining unit 1303 that are shown in FIG. 13 may be implemented by the processor 1420. The processor 1420 receives service data through the communications interface 1410, and is configured to implement the method performed by the receiving node in FIG. 10A and FIG. 10B. In an implementation process, in steps of the processing procedure, the method performed by the receiving node in FIG. 10A and FIG. 10B may be completed using an integrated logic circuit of hardware in the processor 1420 or an instruction in a form of software.

The communications interface 1410 in this embodiment of this application may be a circuit, a bus, a transceiver, or any other apparatus that can be configured to exchange information. For example, the other apparatus may be a device connected to the OTN device 1400. For example, when the OTN device 1400 is applied to a sending node, the other apparatus may be a receiving node or an intermediate node.

In this embodiment of this application, the processor 1420 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed using a combination of hardware in the processor and a software unit. Program code executed by the processor 1420 for implementing the foregoing method may be stored in the memory 1430. The memory 1430 is coupled to the processor 1420. Couplings in the embodiments of this application are indirect couplings or communication connections between apparatuses, units, or modules, may be electrical, mechanical, or another form, and are used for information interaction between the apparatuses, the units, and the modules. The processor 1420 may operate with the memory 1430 together. The memory 1430 may be a nonvolatile memory, for example, a hard disk drive (HDD) or a solid-state drive (SSD), or may be a volatile memory, for example, a random-access memory (RAM). The memory 1430 is any other medium that can be used to carry or store expected program code that has an instruction or a data structure form, and that can be accessed by a computer, but is not limited thereto.

This embodiment of this application does not limit a specific connection medium between the communications interface 1410, the processor 1420, and the memory 1430. In this embodiment of this application, in FIG. 14, the memory 1430, the processor 1420, and the communications interface 1410 are connected using a bus. The bus is represented by a thick line in FIG. 14, and a connection manner between other parts is merely an example for description, and imposes no limitation. The bus may be classified into an address bus, a data bus, a control bus, and the like. For ease of representation, only one thick line is used to represent the bus in FIG. 14, but this does not mean that there is only one bus or only one type of bus.

Based on the foregoing embodiments, an embodiment of this application further provides a computer storage medium. The storage medium stores a software program, and when the software program is read and executed by one or more processors, the method provided by any one or more of the foregoing embodiments may be implemented. The computer storage medium may include any medium that can store program code, such as a USB flash drive, a removable hard disk, a read-only memory, a RAM, a magnetic disk, or an optical disc.

Based on the foregoing embodiments, an embodiment of this application further provides a chip. The chip includes a processor configured to implement a function mentioned in any one or more of the foregoing embodiments, for example, obtain or process the data frame mentioned in the foregoing method. Optionally, the chip further includes a memory, and the memory is configured to execute a necessary program instruction and data. The chip may include a chip, or may include a chip and another discrete device.

A person skilled in the art should understand that the embodiments of this application may be provided as a method, a system, or a computer program product. Therefore, this application may use a form of hardware-only embodiments, software-only embodiments, or embodiments with a combination of software and hardware. Moreover, this application may use a form of a computer program product that is implemented on one or more computer-usable storage media (including but not limited to a disk memory, a compact disc read only memory (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specified function in one or more processes in the flowcharts and/or in one or more blocks in the block diagrams.

These computer program instructions may be stored in a computer-readable memory that can instruct the computer or any other programmable data processing device to work in a specific manner such that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or any other programmable data processing device such that a series of operations and steps are performed on the computer or the any other programmable device, thereby generating computer-implemented processing. Therefore, the instructions executed on the computer or the any other programmable device provide steps for implementing a specified function in one or more processes in the flowcharts and/or in one or more blocks in the block diagrams.

Obviously, a person skilled in the art can make various modifications and variations to the embodiments of this application without departing from the scope of the embodiments of this application. This application is intended to cover these modifications and variations provided that they fall within the scope of protection defined by the following claims and their equivalent technologies of this application.

What is claimed is:

1. A method comprising:
    receiving service data to be mapped to a plurality of consecutive data frames;
    dividing a payload area of the consecutive data frames to produce a plurality of code blocks;
    determining a quantity of the code blocks, occupied by the service data, of the consecutive data frames and locations of the code blocks; and
    mapping the service data to the consecutive data frames based on the quantity of the code blocks and the locations of the code blocks.

2. The method of claim 1, wherein a rate of the service data is less than or equal to 1 gigabit per second (Gbps).

3. The method of claim 1, wherein each of the consecutive data frames is a flexible optical transport network (FlexO) frame.

4. The method of claim 3, wherein each of the consecutive data frames comprises fixed padding.

5. The method of claim 1, wherein each of the consecutive data frames comprises a plurality of consecutive FlexO frames each comprising a fixed quantity of code blocks.

6. The method of claim 1, wherein the consecutive data frames are low-order optical data unit (ODU) frames, and wherein the method further comprises mapping the consecutive data frames that carry the service data to at least one FlexO frame.

7. The method of claim 1, wherein the service data implement a packet-type service, wherein an overhead area of the code blocks comprises an indication field indicating whether a corresponding code block carries the service data.

8. The method of claim 1, wherein the service data implement a constant bit rate service, and wherein an overhead area of the code blocks comprises a payload length field indicating a length of the service data carried by a corresponding code block.

9. The method of claim 8, wherein the overhead area of the corresponding code block further comprises a timestamp field indicating a time at which the service data is mapped to the corresponding code block.

10. The method of claim 1, wherein each of the code blocks further comprises a check area indicating correctness of the service data in the payload area of a corresponding code block and correctness of content based on a field comprised in an overhead area.

11. The method of claim 1, wherein each of the code blocks occupies 192 bytes.

12. A method comprising:
obtaining a plurality of consecutive data frames comprising a plurality of code blocks, wherein a payload area of the consecutive data frames is divided to produce a plurality of the code blocks;
identifying, in the consecutive data frames, code blocks that implement a same service; and
obtaining service data from the code blocks that implement the same service.

13. The method of claim 12, wherein a rate of each code block is less than or equal to 1 gigabit per second (Gbps).

14. The method of claim 12, wherein each of the consecutive data frames is a flexible optical transport network (FlexO) frame.

15. The method of claim 14, wherein each of the consecutive data frames further comprises fixed padding.

16. The method of claim 12, wherein each of the consecutive data frames further comprises a plurality of consecutive FlexO frames each comprising a fixed quantity of code blocks.

17. An apparatus comprising:
a memory configured to store instructions; and
a processor coupled to the memory and configured to execute the instructions to cause the apparatus to:
receive service data to be mapped to a plurality of consecutive data frames;
divide a payload area of the consecutive data frames to produce a plurality of code blocks;
determine a quantity of the code blocks, occupied by the service data, of the consecutive data frames and locations of the code blocks; and
map the service data to the consecutive data frames based on the quantity of the code blocks and the locations of the code blocks.

18. The apparatus of claim 17, wherein a rate of the service data is less than or equal to 1 gigabits per second (Gbps).

19. The apparatus of claim 17, wherein each of the consecutive data frames is a flexible optical transport network (FlexO) frame.

20. The apparatus of claim 19, wherein each of the consecutive data frames further comprises fixed padding.

21. The apparatus of claim 17, wherein each of the consecutive data frames comprises a plurality of consecutive FlexO frames, and wherein the consecutive FlexO frames comprise a fixed quantity of code blocks.

22. The apparatus of claim 17, wherein each of the code blocks occupies 192 bytes.

23. The apparatus of claim 17, wherein the consecutive data frames are low-order optical data unit (ODU) frames, and wherein the processor is further configured to execute the instructions to cause the apparatus to map the consecutive data frames that carry the service data to at least one FlexO frame.

24. The apparatus of claim 17, wherein the service data implement a packet-type service, wherein an overhead area of the code blocks comprises an indication field indicating whether a corresponding code block carries the service data.

25. The apparatus of claim 17, wherein the service data implement a constant bit rate service, and wherein an overhead area of the code blocks comprises a payload length field indicating a length of the service data carried by a corresponding code block.

26. The apparatus of claim 25, wherein the overhead area of the corresponding code block further comprises a timestamp field indicating a time at which the service data is mapped to the corresponding code block.

\* \* \* \* \*